May 30, 1939.  E. O. HAMREN  2,160,697
ABRADING APPARATUS
Filed Feb. 24, 1936  7 Sheets-Sheet 1

Inventor
Eric O. Hamren
By Strauch & Hoffman
Attorneys

May 30, 1939.  E. O. HAMREN  2,160,697

ABRADING APPARATUS

Filed Feb. 24, 1936  7 Sheets-Sheet 2

Inventor
Eric O. Hamren

By Strauch & Hoffman
Attorneys

May 30, 1939.  E. O. HAMREN  2,160,697

ABRADING APPARATUS

Filed Feb. 24, 1936   7 Sheets-Sheet 5

Inventor
Eric O. Hamren

By Strauch & Hoffman
Attorneys

May 30, 1939.                E. O. HAMREN                2,160,697
                           ABRADING APPARATUS
                   Filed Feb. 24, 1936        7 Sheets-Sheet 6

Inventor
Eric O. Hamren
By Strauch & Hoffman
Attorneys

Patented May 30, 1939

2,160,697

UNITED STATES PATENT OFFICE 2,160,697

ABRADING APPARATUS

Eric O. Hamren, Hagerstown, Md., assignor to Pangborn Corporation, Hagerstown, Md., a corporation of Maryland Application February 24, 1936, Serial No. 65,509

31 Claims. (Cl. 51—9)

The present invention relates to abrading machines and it is more particularly concerned with machines for cleaning large or heavy castings, although they are not limited to such use.

In the past, castings have been treated in two ways. The small castings have either been placed in a tumbling drum and simultaneously subjected to the action of a sand blast or have been placed on rotating tables and cleaned. The larger and heavier castings have been placed on a truck in a blast room and one or more workers have cleaned them with air blast nozzles.

This method of cleaning large castings is open to many objections. In the first place it is a manual operation and is accordingly expensive. Moreover, the time consumed in loading articles on the truck, pushing it into the blast room, closing the doors, blasting the exposed surfaces of the work, turning the work over to blast the underside thereof and finally removing the work from the blast room materially limits the amount of work that can be handled by such methods and also subjects operators to unfavorable working conditions.

Such prior methods are also objectionable because they do not secure a uniformly cleaned product. Especially is this true when different workers are used since the angle of the blast stream and the duration of the treatment which are both in the discretion of the worker, materially affect the final condition of the product.

Although automatic or semi-automatic blasting machines have been heretofore proposed for special purposes, for instance for frosting the interior or exterior of glass globes and the like, for cleaning eggs, for cleaning automobile rims and for cleaning ceramic articles, none of these machines are capable of, nor are they contemplated for cleaning castings, much less for cleaning all sides of large castings of irregular sizes and shapes. Such prior machines moreover would not sufficiently clean castings nor would they clean all surfaces of castings even if they were redesigned to handle a particular sized and shaped casting.

It is accordingly a primary object of this invention to provide an abrading machine that will uniformly and efficiently clean all of the surfaces of castings of irregular sizes and shapes without manual aid, and to generally improve the abrading apparatus disclosed in the application of William A. Rosenberger, Serial No. 34,990, filed August 6, 1935.

A further major object of this invention is to provide an abrading machine that will take an article of work into a blasting zone, cause the article to dwell and simultaneously rotate about a substantially vertical axis in the blasting zone and present all of its surfaces to one or more abrasive blast streams.

It is another object to provide in an abrading machine, an automatic mechanism for comparatively rapidly bringing articles of work into a blast zone and for causing them to dwell and rotate about substantially vertical axes in the blast zone for a comparatively long time and having means for selectively varying the time which the work dwells in the blast zone.

A further object is to provide an abrading machine having conveying means for carrying the articles of work through a closed path into and out of a blasting cabinet and which is so designed that none of the parts of the conveying means project down below the top of the cabinet, whereby the cabinet is fully accessible from all sides, and moving parts are not subject to abrading.

Another object is to provide an abrading machine having a cabinet with a slotted roof through which suspended work carriers may travel, with novel means for sealing the slot against abrasive or dust egress.

My invention also aims to provide a novel combination of blast wheels for use in an abrading machine that will insure efficient cleaning of all of the surfaces of the work, and novel control mechanisms therefor.

A further object is to devise a novel method of abrading articles such as large castings and the like.

Another object is to devise novel conveyor mechanisms for use in an abrading machine for conveying articles of work therethrough.

A further object is to provide novel work turning mechanisms for an abrading machine.

My invention also aims to provide, for use in an abrading machine having a plurality of abrasive propelling devices, novel means for recovering and purifying the spent abrasive and a novel device for feeding it back to the abrasive propelling devices.

Another object is to devise a cabinet for an abrading machine which embodies novel dust collecting, dust arresting and abrasive wear resisting features.

Further objects of the invention will become apparent as the specification proceeds in connection with the annexed drawings, and from the appended claims.

With continued reference to the drawings, wherein like reference characters have been employed to designate like parts throughout the several figures thereof, the machine comprises in general a cabinet A which is of generally U-shape in top plan view, a conveyor mechanism B supported above the cabinet and adapted to propel a plurality of work carriers C through the cabinet, a plurality of abrasive propelling devices D, which provide a blasting zone within the cabinet, a mechanism E for intermittently advancing the carriers through the blasting zone, a work turning mechanism F for rotating the work as it dwells in the blasting zone, an abrasive reclaiming mechanism for recovering and cleaning the abrasive after it has been spent, and a mechanism for returning the reclaimed abrasive to the abrasive propelling device.

*Work supporting mechanism*

Figure 3:
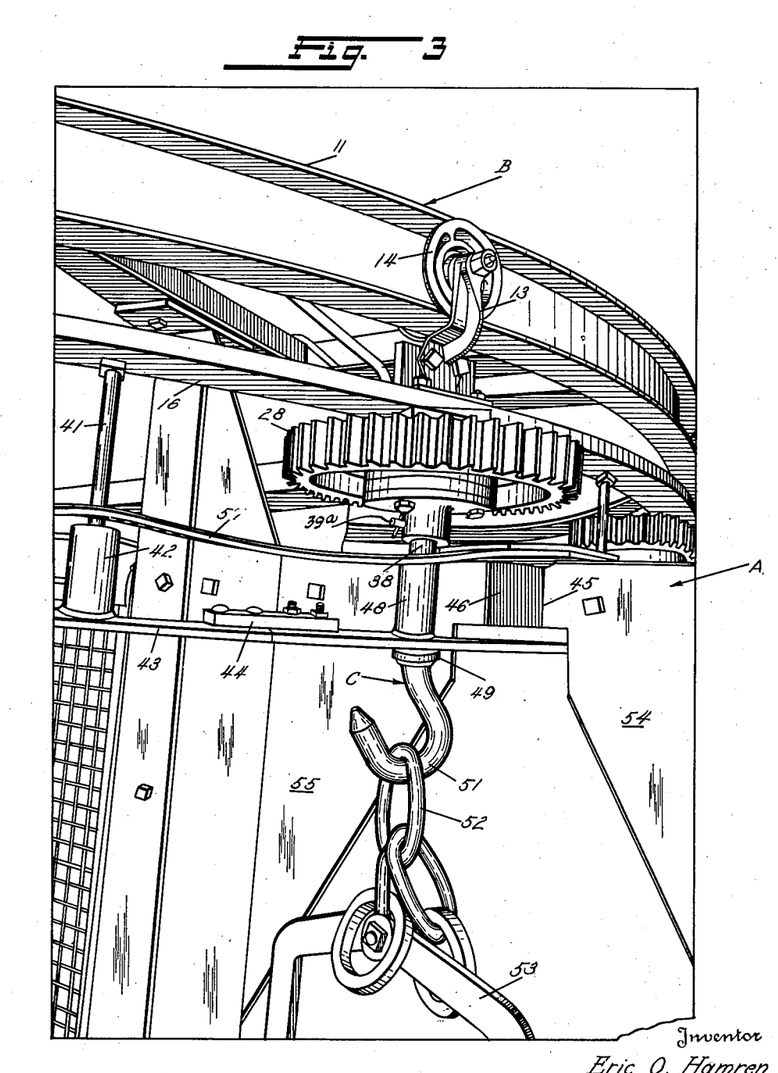
Figure 3 is a perspective view of a part of the machine shown in Figure 1 and illustrates a work carrier assembly emerging from the cabinet.
Figure 4:
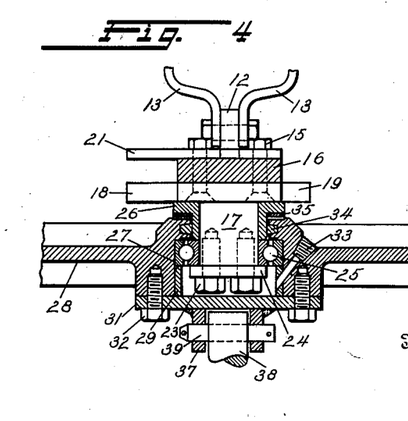
Figure 4 is a vertical sectional view through one of the work carrier assemblies shown in Figure 3.

Supported above the cabinet, preferably by a plurality of bridge-forming angle members 10, which rest on the cabinet, is a preferably circular I-beam member 11 which constitutes a monorail conveyor track. Referring more particularly to Figures 3 and 4, supported at spaced points on mono-rail 11 are a plurality of brackets 12, by means of a pair of arms 13, and a pair of rollers 14.

Secured to each bracket 12 by means of bolt assemblies 15 is a comparatively massive ring 16, and a shaft member 17 having an integral flange portion providing ratchet teeth 18 and 19. Bracket 12 is also provided with a tooth-forming portion 21. Teeth 18 and 21 are adapted to cooperate with the work advancing mechanism to be hereinafter described, and teeth 19 of the bracket assemblies cooperate with a back-stop pawl to prevent reverse rotation of the carriers in a manner to be hereinafter set forth.

Secured to the lower end of each shaft member 17 by means of cap screws 23 and washer 24 is a bearing assembly 25 which clamps a spacer and seal member 26 against the flanged portion of shaft 17. Bearing assembly 25 is secured in a recess 27 in a gear 28 by means of a spacer 29, a plate 31 and cap screws 32. Lubrication of the bearing assembly is provided by a duct 33 to which may be secured a pressure fitting. The lubricant is protected against abrasive contamination by a radial seal 34 bearing against a cylindrical surface on the seal member 26 and an axial seal 35 against a disc-like face provided on the seal member 26.

Secured to or formed on the under face of plate 31 is a socket member 37 which receives a work support 38. Each work support is detachably held in its socket by means of a shaft member 39 and the latter is in turn held in place by means of cotter pins 39a.

With reference to Figure 3, secured to ring 16 intermediate each work supporting assembly is a spacer member 41 which extends through a socket 42 and is secured to a preferably rigid ring member 43. Ring member 43 may be made in two or more parts and joined together to form a continuous ring by means of a splice member 44 and it constitutes an abrasive baffle.

The upper surface of cabinet A is provided with an arcuate slot 45 concentric to that of the mono-rail track 11 and is of a width sufficient to allow socket members 42 to pass freely therethrough when the conveyor is actuated. Slot 45 is defined on either side by a curved plate 46 which terminates at the upper edge of the cabinet. Therefore, the slot assembly takes the form of a pair of downwardly extending flanges terminating flush with the upper surface of the cabinet.

Each work support 38 extends downwardly through a socket member 48 rigidly secured to ring 43 and is provided with an abrasive baffling flange 49 and a work supporting hook 51. The work is supported upon hook 51 in any suitable manner, as for instance by means of a chain 52 and a tong assembly 53.

The exit side of the machine is shown in Figure 3 and the carrier and work is shown leaving the machine. The front of the cabinet as seen in this figure comprises a pair of plates 54 and 55 having inclined edges so as to make the opening as small as possible without interfering with passage of the work.

It is therefore seen that all of the working parts of the work turning and conveying mechanism are located outwardly of the actual blast chamber and in order to assist in preventing abrasive from rebounding upwardly through slot 45 and thereby possibly getting into the mechanism, a flexible element 57, preferably of thick rubber, is mounted upon sockets 42 and 48 and is apertured to permit spacers 41 and work supports 38 to freely pass therethrough. Sockets 42 and 48 terminate short of the top of the cabinet and therefore when the conveyor structure is rotated, ring 57 is lifted up on the top of the cabinet and frictionally rides thereupon adjacent the slot 45. It is accordingly seen that as the conveyor assembly, defined by rollers 14, ring 16, the gear assembly and ring 43, rotate, ring 43, which is preferably wider than slot 45, prevents rebounding abrasive from escaping directly through the slot and rubber ring 57, which forms a tight seal with the upper surface of the cabinet, prevents any dust or fine abrasive from being carried out of the cabinet.

*Conveyor advancing mechanism*

Figures 6, 8, 9:
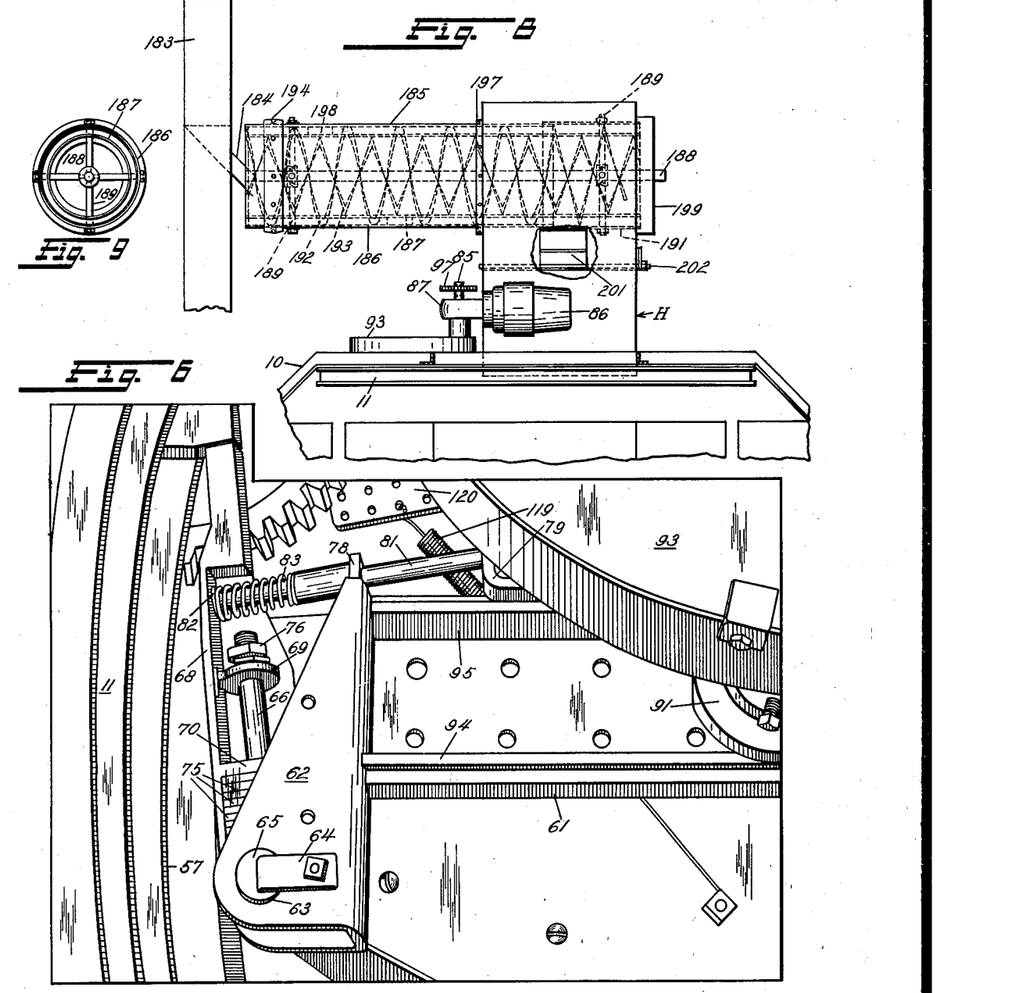
Figure 6 is a perspective view of a part of the machine shown in Figure 1 and illustrates one end of the walking beam and its interconnected work advancing pawl assembly.
Figure 8 is a front view of the upper part of the machine illustrated in Figures 1 and 2, and illustrates the abrasive reclaiming mechanism and the supports for the monorail carrier.
Figure 9 is an end view of the abrasive reclaiming drum illustrated in Figure 8 as it appears when viewed from the left-hand end of that figure.

Supported above the cabinet for rocking movement about the axis of the conveyor in any suitable manner, is a channel member 61 which will hereinafter be referred to as the walking beam. The walking beam carries at each end thereof a pawl assembly and as they are identical in construction only one of them will be described in detail. With reference to Figure 6, a bracket 62 of generally U-shaped section and providing two spaced bearings 63, is welded or otherwise secured to the end of walking beam 61. Detachably mounted in bracket 62, by means of a clip 64, is a pin 65 upon which is journaled a bolt member 66 having an enlarged bearing portion 67. Each pawl comprises an angle member 68 having a pair of spaced webs 69 and 70 secured thereto as by welding 72.

Figure 7:
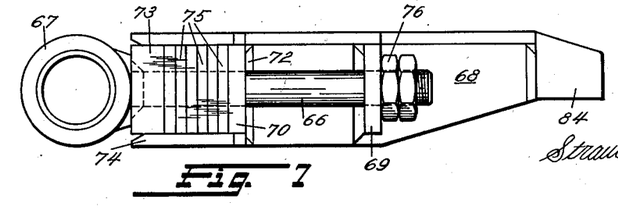
Figure 7 is a top plan view of one of the pawls used in my machine.

Screw 66 extends through webs 70 and 69, and disposed between bearing portion 67 and web 70 is a square steel washer 73, which is guided between one side of the angle and a plate 74 provided on pawl 68, and a plurality of resilient washers 75 which may be of rubber, fabric or any other suitable material having the required degree of resilience. The parts are clamped in place by means of a pair of nuts 76 threaded on screw 66. A resilient or yielding connection is accordingly provided between the parts of pawl 68 and the impulse applied to pin 65 is resiliently transmitted to pawl 68 as movement of bearing portion 67 of screw 66 to the right (Figure 7) compresses resilient washers 75.

Mounted on one end of bracket 62 is a guide 78 and a similar guide 79 is secured to the walking beam. A plunger 81, slidably mounted in guides 78 and 79 and having a head 82, is resiliently urged against the pawl by means of a compression spring 83 thereby tending to bring the pawl into engagement with the work carrier. The engaging face 84 of pawl 68 is of considerable vertical width whereby it may simultaneously cooperate with the teeth 18 and 21 of the work supports. The machine may be provided with a plurality of sets of pawls of different lengths which may be selectively mounted on the walking beam for stopping the work in different regions of the blast zone, but it is to be understood if desired the engaging face of the pawl may take the form of an adjustable member mounted on the body of the pawl, so that the same set of pawls may be employed to give various stopping points. Also, mechanism to be hereinafter described makes it possible to adjust the dwell point with a single set of pawls.

It is accordingly apparent that as the walking beam is reciprocated about the axis of the conveyor, the pawls will ride up over teeth 18 and 21 of the carrier involved and snap behind them on the back stroke under the influence of springs 83, and on the forward stroke will engage behind teeth 18 and 21 and advance the carriers one step or a distance equal to the spacing of the carriers. The stroke of the walking beam is preferably greater than the spacing of the carriers for purposes to be hereinafter described.

Figure 2:
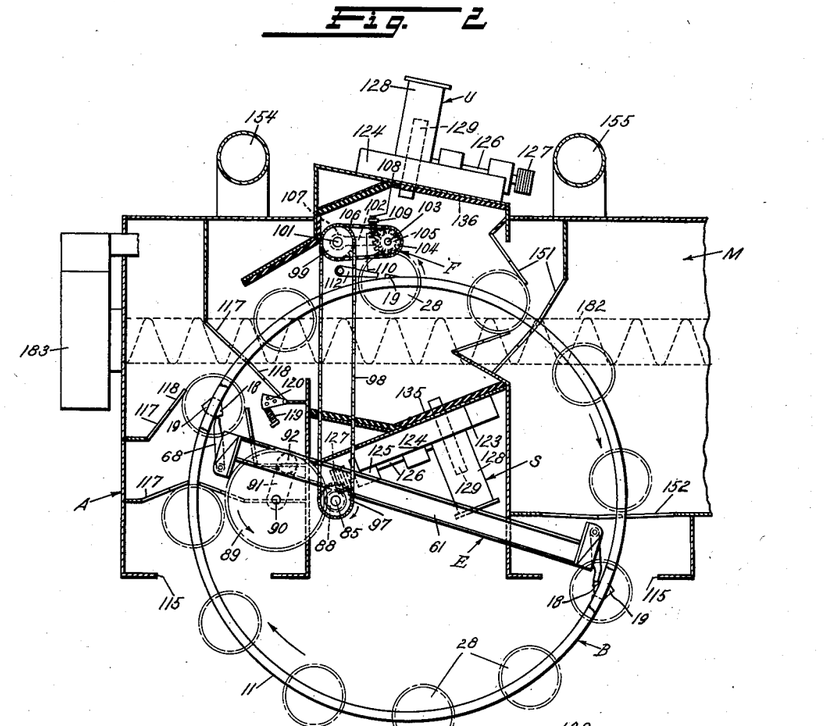
Figure 2 is a top plan view with parts of the machine removed and other parts in section of the machine shown in Figure 1.

Although any suitable mechanism may be employed for reciprocating the walking beam, in this form of my invention, I preferably employ a mechanism that will advance the conveyor comparatively rapidly on its forward stroke and then will move at its lower rate on its backward or idle stroke so as to allow the work to dwell in the blasting zone for a maximum period of time. One form of mechanism that may be used is shown in Figures 2 and 6 and it comprises a driving shaft 85 supported for rotation in any suitable manner and driven by motor 86 and a reduction gear 87 (Figure 8) supported on girders 10. Shaft 85 carries a pinion 88 and meshes with a gear 89 mounted on a crankshaft 90 and the latter is supported for rotation in any suitable manner (not shown). Secured to shaft 90 is a crank arm 91 which carries a freely journaled roller 92 at its free end. Pinion 88 and gear 89 are enclosed by a housing 93 to protect them from atmospheric dust.

With reference to Figure 6, roller 92 rides between two raceways 94 and 95 welded to the channels of walking beam 61. Sufficient clearance is provided to allow roller 92 to freely ride between raceways 94 and 95. With reference to Figure 2, with the parts rotating in the direction indicated by the arrow, crank arm 91 is disposed at the end of its work advancing movement and has brought a carrier into proper position in the blasting zone. Further movement of crank 91 will cause roller 92 to engage raceway 94 of walking beam 61 and rock the same anti-clockwise in its backward or idle stroke. It should be particularly observed that when the crank 91 rotates through 180 degrees during the backward stroke, roller 92 acts upon portions of the walking beam of increasing radius, with the result that the walking beam moves at a minimum speed approximately 90 degrees from the crank position shown in Figure 2. On the other hand, when crank 91 is rotated on the advancing stroke it acts upon portions of walking beam 61 of decreasing radius, with the result that the walking beam undergoes a maximum speed when the crank arm is disposed approximately 270 degrees from the position shown in Figure 2. Therefore, by reason of the arrangement of parts disclosed, and which utilizes short radius arms on the advancing stroke and long radius arms on the idle stroke, the conveyor mechanism is stepped forward or advanced comparatively rapidly and then is permitted to dwell for a considerable period of time while the walking beam makes its comparatively slow return stroke. In another form of my invention the crank is rotated in the opposite direction, and therefore the appended claims are intended to cover my machine irrespective of the direction of rotation.

Although I have shown a particular mechanism for advancing the conveyors comparatively rapidly and allowing them to dwell in the blast zone, it is to be understood that any other suitable mechanism may be employed for this purpose. For instance, a simple ratchet assembly, actuated by a fluid piston and cylinder assembly and having an automatically timed valve mechanism, for advancing the carrier and allowing it to dwell any desired period of time in the blasting zone may be employed without departing from the spirit of my invention. One alternative form of mechanism will be described hereinafter.

Work turning mechanism

Driving shaft 85 also carries a sprocket 97 which through a chain 98 drives a sprocket 99 supported on a shaft 101. Shaft 101 is mounted for rotation in any suitable manner and supported for rocking movement about shaft 101 is an arm assembly 102 upon which is journaled a shaft 103 carrying a sprocket 104 and a pinion 105. A second chain 106 cooperates with sprocket 104 and a second sprocket 107 mounted on shaft 101 for establishing a driving connection between shafts 101 and 103. Connected to arm 102 is a bolt member 108 which passes through a fixed abutment 109. A compression spring 110 acts against arm 102 and reacts against abutment 109 to resiliently urge arm 102 in a clockwise direction and thereby tend to bring pinion 105 into mesh with the teeth of gear 28 of the particular carrier that is in the blasting zone. The head of bolt 108 cooperates with the rear face of abutment 109 to limit movement of arm 102 under the influence of spring 110 to thereby prevent the teeth of the gear from meshing too deeply.

Assuming that the walking beam is advancing a carrier into the blast zone, gear 28 thereof strikes pinion 105 and meshes therewith. In the event that during this operation the teeth do not initially mesh properly, or strike top-to-top, arm 102 will merely swing backward slightly against the action of spring 110, but will swing back as soon as the gears have meshed. When the gears have been brought into mesh, gear 28 begins to revolve anti-clockwise in Figure 2 and accordingly rotates the work about a vertical axis in a counter-clockwise direction in the blasting zone. It has been found that under some conditions of loading initial engagement of pinion 105 and gear 28 tends to rotate the whole carrier assembly backwardly or anti-clockwise (Figure 2), and I have accordingly provided a backstop pawl 112 pivoted in any suitable manner and cooperates with teeth 19 of the particular carrier assembly that has been stopped in the blasting zone. It is to be understood that if pawls 68 are changed to provide a different dwell point backstop pawl 112 will likewise be changed to meet the new conditions or a universal pawl of the type to be hereinafter described will be used.

In view of the manner in which pinion 105 is supported, the work advancing pawls 68 may be adjusted so as to stop the work some degree ahead of or behind the point of intersection of the blast streams without requiring adjustment of the parts, and they are accordingly self-compensating. If desired, however, bolt 108 or abutment 109 may be adjusted to locate pinion 105 closer to or further from gear 28 in the event that the dwell point is to be materially changed. Too great offset in the dwell point, however, is undesirable as a great part of the abrasive streams will not strike the work at all and hence will be wasted.

Blast chamber construction

The cabinet is provided with a work entrance opening 115. Inside the cabinet are provided three pairs of doors 117 for providing three vestibules to baffle the abrasive and dust and prevent it from escaping from the cabinet. As seen in Figure 2 the spacing of doors 117 along the path of movement of the conveyor is such that they are out of registry with the carrier assemblies so that at least one pair of doors is always closed. Each door is provided with a rubber flap 118 at its free edge for enhancing the sealing action and each door is urged toward closed position by a tension spring 119 acting upon an arm 120 secured to the door. Only one assembly has been shown as they are all alike. As seen in Figure 6, arm 120 and spring 119 are located above the top of the cabinet and hence out of the dust-laden atmosphere. The doors are preferably operated by engagement of the work pieces therewith, but if desired a separate door operating means may be employed. An advantage of the preferred arrangement is that the doors are only opened when an article of work is actually passing through the machine, thereby minimizing the possibility of dust and abrasive leakage from the cabinet.

Figure 5:
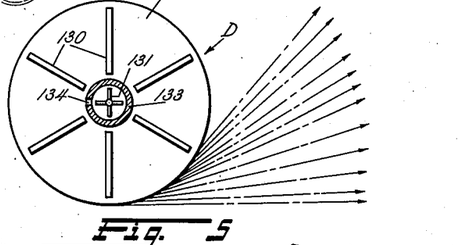
Figure 5 is a transverse diagrammatic view of one of the abrasive propelling wheels employed in the machine.

In the central part of the cabinet, which will be hereinafter referred to as the blasting zone, are located a plurality of abrasive propelling devices for impinging upon the work as it dwells in the blasting zone. Although any suitable form of abrasive propelling device may be employed, I preferably use mechanical abrasive projecting mechanisms and in the present instance they have been shown as comprising centrifugal abrasive throwing wheels. Supported upon the central wall of the cabinet 123, and preferably mounted for vertical adjustment thereon, is a centrifugal wheel comprising a base 124, bearings 125 which support a shaft 126 having a pulley 127, a wheel housing 128. With reference to Figure 5, a rotor or wheel 129 is rigidly mounted upon shaft 126 and is provided with a plurality of substantially radially disposed blades 130 which terminate short of the axis to define a central abrasive admitting space. Also supported on rotor 129 is an impeller blade assembly 131. Mounted in the abrasive admitting space, and surrounding the impeller, is a hollow control member 133, which is provided with a discharge slot 134.

Control member 133 is stationarily supported but is mounted for angular rocking adjusting movement about the axis of rotor 129, so that the direction of discharge may be varied to suit the particular type of work involved. Shaft 126 is rotated at comparatively high speed (approximately 2400 R. P. M.) and the abrasive is fed into the interior of control member 133 whence it is picked up by impeller blades 131 and projected through opening 134. The abrasive is then picked up by blades 130 and slides outwardly over their surfaces under the influence of centrifugal force and is discharged from their tips at an abrading velocity. In view of the fact that the abrasive is admitted to only a limited peripheral region of the abrasive admitting space, the abrasive discharge is limited to a localized angular region as seen in Figure 5. The abrading wheel just discussed forms no part of the present invention and it accordingly will not be further described. All of the abrading wheels employed in my machine are of the same character and therefore only one of them has been described and similar reference characters have been applied to all of them. For a more detailed disclosure of the abrading wheel reference may be had to the copending application of William A. Rosenberger and Walter L. Keefer, Serial No. 726,188, filed May 17, 1934.

The various rotor shafts 126 are preferably driven by individual electric motors mounted upon each base 124, but they have not been shown in order to simplify the disclosure. In the interest of brevity, the abrasive propelling devices will be referred to hereinafter merely as wheels, and the wheel mounted upon wall 123 will be termed wheel S.

Figures 1, 22, 25:
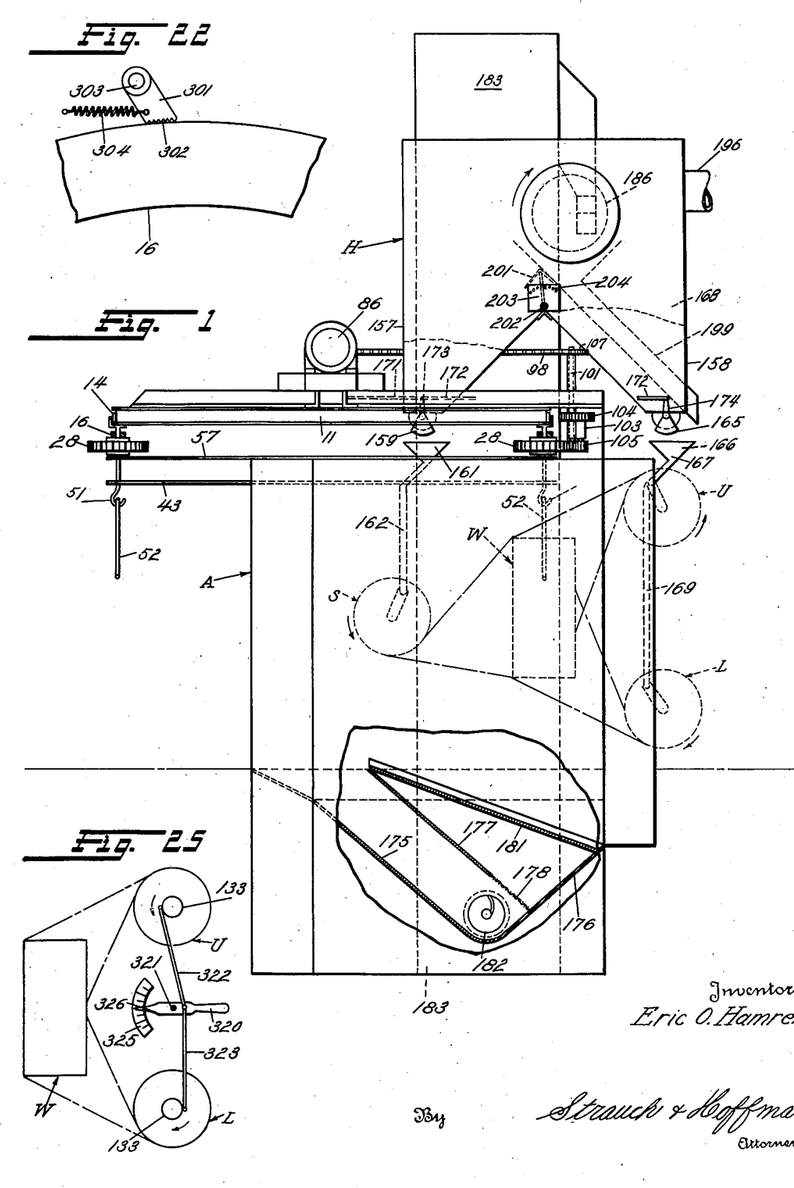
Figure 1 is an end view in elevation of the machine of my invention and parts thereof have been broken away in order to more clearly illustrate the construction involved.
Figure 22 is a top plan fragmental view of a back stop pawl assembly preferably used in the machine when it is equipped with the crank assembly of Figures 20 and 21.
Figure 25 is a diagrammatic view of a control mechanism for the wheels shown in Figure 1, forming part of the invention.

Referring now to Figure 1, wheel S functions as an undershot wheel, i. e., the discharge originates mainly below the axis of the wheel, and discharges against or cleans substantially the whole side of the piece of work W shown in place in the blasting zone.

Mounted on the rear wall of cabinet A are two wheels U and L. Wheel U functions as an overshot wheel and its blast stream (indicated by the broken lines in Figure 1) is directed against the top of the work and the upper portions of its sides as it rotates. The lower wheel L functions as an undershot wheel and as seen in Figure 1, it cleans the lower surface and the lower portions of the sides of work piece W as it is rotated in the blasting zone. As seen in Figure 2, the wheels U and L are offset from wheel S so that they will not discharge into each other during the interval that work is advanced. In order to reduce wear of the inner walls of the cabinet to a minimum they are provided with any wear resistant material such as steel or rubber target pieces 135 and 136, or any other suitable material.

For blasting work that is free from cavities or which has only shallow cavities, it is satisfactory to stop each successive carrier as it reaches the intersection of the center lines or axes of the blast streams of the various wheels, (indicated in broken lines in Figure 1). In Figure 2 it is observed that the carrier disposed in blasting position rotates the work about a vertical axis at the intersection of the blast streams and also that the blast streams intersect at a point located in the path of movement of the carrier. I prefer to use this arrangement as it has proven entirely satisfactory, but it is to be understood that if desired the blast streams may intersect at a point remote from the path of movement of the carriers and that also the work may be stopped at a point either side of the point of intersection of the blast streams, depending upon the character of work operated upon. Therefore, the term "blasting zone", as employed in the appended claims, is intended to cover the location of the work when it is disposed in any of the above described dwell points.

In Figures 10, 11, 12 and 13, I have illustrated diagrammatically the action of the blast stream upon a hollow or cavitied piece of work, and it is seen that the axis 138 about which the work revolves is located beyond the point of intersection 139 of the blast streams. In the present instance, the article of work is illustrated as a cylinder block for an internal combustion engine and comprises a cylinder portion 141 and a crankcase portion having side walls 142 and 143.

Figure 10:
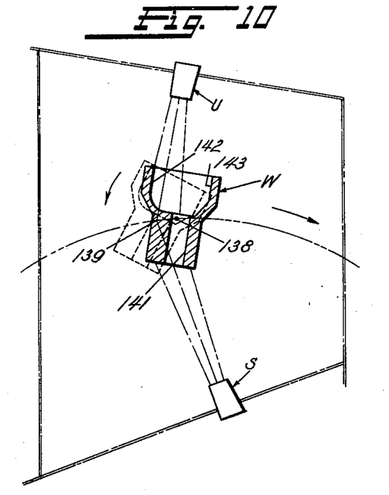
Figures 10, 11, 12 and 13 are diagrammatic views illustrating the cleaning action of the abrasive streams upon a hollow piece of work as it is rotated in the blast zone, and it also illustrates (in dotted lines) the cleaning action that would take place if the work were rotated at the intersection of the axes of the blast streams.

In Figure 10 wheel S is seen cleaning the interior of the cylinder walls and wheels U and L are cleaning crankcase wall 142. Also indicated in dotted lines in this figure is the same article of work supported at the intersection of the blast streams, and it is observed that although wheel S is cleaning in the exterior of the block, wheels U and L are cut off from interior wall 142 of the crankcase.

Figure 11:
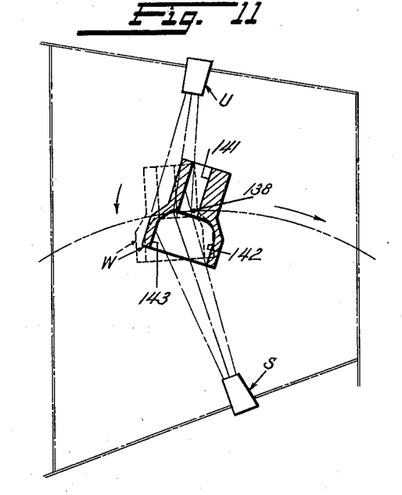

In Figure 11, the work has been rotated through approximately 180 degrees in the direction indicated and wheel S now cleans walls 143 of the crankcase and wheels U and L are cleaning the other half of the cylinder walls and the exterior sides.

Figure 12:
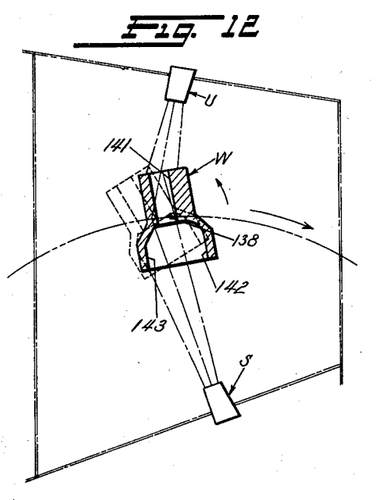
Figure 13:
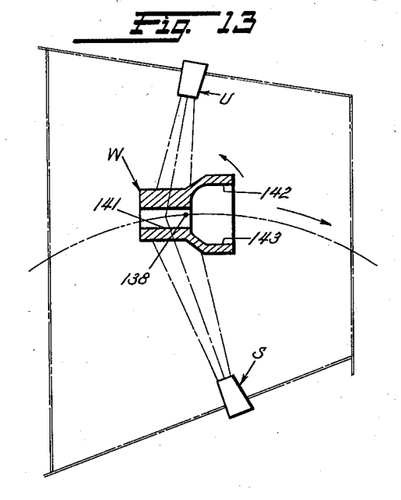

In Figure 12 the work has been rotated a slightly further distance and wheel S is now cleaning the full width of crankcase wall 143 and the wall of the cylinder. In Figure 13 the work has been rotated approximately 270 degrees from the position of Figure 10 and the wheels S, U and L are cleaning the external surfaces of the work.

In Figure 11 the dotted lines indicate how a cylinder block supported at the intersection of the blast streams blocks off wall 142 and in Figure 13 it illustrates how it cuts off wall 143 when thus supported.

It is accordingly seen that by using at least two abrasive streams, one located at each side of the article, and that by rotating the work about an axis offset from the intersection of the blast streams, pieces of work having deep cavities may be thoroughly cleaned. In Figure 2 the work is, of course, rotated about an axis intersecting the blast streams and this is entirely satisfactory where work W assumes the form of a billet or the like. Although three wheels have been shown, it is to be understood that four or more wheels may be used if desired, depending upon the nature or shape of the work to be cleaned.

In the event that the work handled by the machine is longer or shorter vertically than that illustrated in Figure 1, the blast wheels may be adjusted to thoroughly clean it irrespective of its vertical dimension. For instance, if long articles are to be cleaned, the blast stream from wheel U is raised or rocked slightly clockwise about its axis and the blast stream from wheel L is lowered or rotated anti-clockwise about its axis. These adjustments are easily effected by rocking the control members 133 of the respective wheels in the proper direction to bring the blast streams into the proper position. Also, if the character of the work handled by the machine requires it, the wheels U, L and S may be adjusted up or down on the cabinet as their bases are preferably secured thereto by bolts passing through vertically elongated slots therein. Although the wheels illustrated operate continuously irrespective of whether the carriers are advancing or are stationary, they may, if desired, be interconnected with the carrier stepping mechanism so as to only discharge abrasive when the work is in the blasting zone. One form of mechanism for accomplishing this will be disclosed hereinafter.

After the work has been cleaned it passes out of the blasting chamber by way of two pairs of doors 151 which are identical with doors 117 previously described, for baffling abrasive contained in the atmosphere in the blasting chamber. The work then passes into a chamber M where any desired finishing operation may be performed upon the work. Chamber M is preferably large enough to accommodate at least one worker who may for instance apply an air blast to the articles as they emerge from the blasting chamber to remove any accumulated abrasive and dust therefrom. As the work emerges from the chamber M it passes through a pair of spring actuated doors 152 similar to those previously discussed. The work may then be removed from hook 51 and replaced by new work, or if desired the work may be allowed to remain on the hook for a second passage through the machine for a further cleaning operation. In order to carry away any dust that may be formed during the blasting operation, the cabinet is provided with a pair of exhaust conduits 154 and 155 which are preferably led to suitable air exhausting and dust collecting apparatus. The action of exhaust conduits 154 and 155 establishes a slightly subatmospheric pressure in the apparatus and minimizes the tendency for any dust to escape into the atmosphere.

Abrasive supply system

Abrasive may be supplied to the various wheels in any suitable manner, but I preferably employ an abrasive hopper H having a front leg 157 and a rear leg 158. As seen in Figure 1 the hopper is mounted directly over the mono-rail carriers and its legs straddle rail 11. Mounted at the lower end of leg 157 is an abrasive valve 159 for metering the quantity of abrasive flowing into a hopper 161 located therebeneath. Hopper 161 is connected to the control member 133 of wheel S by means of a pipe 162. Connected to rear leg 158 are a pair of abrasive control valves 164 and 165, which cooperate with hoppers 166 and 167 respectively. Hopper 167 leads into the intake of wheel U and hopper 168 is connected by means of a conduit 169 to the inlet of wheel L. The various abrasive valves are preferably, though not necessarily, synchronously controlled by means of links 171 and 172 which are connected to arms 173 and 174 of the abrasive valves, the rear valves being coupled together on the same shaft. Accordingly, by reciprocating rods 171 all of the abrasive valves may be simultaneously opened to any desired degree, to control the quantity of abrasive fed to the wheels, or closed to stop the blasting operation.

Abrasive reclamation apparatus

The spent abrasive falls into a hopper having walls 175 and 176 and a baffle 177, which terminates in a screen 178 at its lower end. Mounted over the hopper is a channel member 181 for the purpose of preventing wheel U from abrading the hopper walls. The wheels S and L are under-shot wheels and it is therefore not necessary to guard against them. Wheel U, however, discharges downwardly in a vertical plane, and it has been found that by making channel 181 of a width equal to the blast stream width it will fill up with abrasive and thereby protect the hopper and also guard the channel against abrasion.

Mounted in the bottom of the hopper is a horizontal screw conveyor 182 which may be driven in any suitable manner and which propels the spent abrasive to an elevator 183, the latter being of any suitable type. Elevator 183 discharges the abrasive through a chute 184 into a cleaning drum 185.

Drum 185 comprises an outer imperforate shell 186 and an inner perforated shell or screen 187 which are mounted in spaced concentric relation upon a shaft 188 by means of a plurality of arms 189. The right-hand end of drum 186 is provided with a perforated portion 191 through which the cleaned abrasive drops into hopper H. Mounted between the two drums is a helix 192 and a similar helix 193 is provided on the interior of screen 187. A pulley 194 is secured to the outer surface of drum 186 and power may be applied thereto in any suitable manner.

The hopper is completely closed and is connected to the suction and dust collecting system by means of a conduit 196 for establishing a draft of air from left to right in the drum. A seal ring 197 is mounted on the outside of drum 186 and cooperates with the vertical wall of hopper H providing a substantially air-tight joint between the parts.

As the spent abrasive enters the drum by way of chute 184, a part of the dust contained therein is freed by reason of the air currents entering the open end of the drum and is carried away to the dust collector. The abrasive and dust falls through screen 187 and is lifted by means of a plurality of paddles 198 disposed between the drums, and when it reaches a point near the top of the drum it is thrown back through the screen and into the path of the moving air stream, which removes the dust therefrom. Any refuse such as nails, casting fragments and the like, which are too large to pass through screen 187, are propelled along by the inner helix until they drop out of the end of the screen 187 where they fall into a chute structure 199 and may be carried away to any suitable container. When the abrasive finally reaches the right hand end of the drum under the propelling action of helix 192, it has been freed of all dust and "fines" and is dropped into hopper H, and is ready for re-use.

In view of the fact that front legs 157 of hopper H feed but a single wheel and rear leg 158 feeds two wheels, it is necessary that the rear leg contain twice as much abrasive as the front leg, and in order to maintain a proper ratio between the abrasive dropping out of drum 186 a selector member 201 is mounted in the hopper beneath drum 186 for rocking movement about a shaft 202. Shaft 202 is provided with a crank arm 203 located outside the cabinet and is equipped with a pin which may be selectively inserted in a plurality of holes 204 located on a plate secured to the hopper exterior.

With the drum rotating in the direction indicated in Figure 1, it is apparent that by reason of the tangential discharge of the abrasive the greater part of it escaping from drum 186 would naturally find its way to the front leg of the hopper. Therefore deflector plate 201 is employed primarily to deflect abrasive to the rear leg, especially when the abrasive supply is low. Normally, if an adequate abrasive supply is maintained, the legs of the hopper will be maintained full at all times and the abrasive will overflow from one to the other.

Although I prefer to mount wheels U and L on the same side of the cabinet, it is to be understood that if desired wheel L may be mounted under wheel S without departing from the spirit of the invention. Likewise wheels U and L are preferably overshot and undershot wheels respectively because it enables the wheels to be compactly located with respect to the central axis of the work and it also locates wheel L where the rebounding abrasive will not find its way into the wheel. Moreover, wheels U and L may, if desired, be mounted further above and below the work respectively and be designed to discharge as undershot and overshot wheels without departing from the spirit of the invention. Also, four or more wheels may be mounted in the cabinet and arranged to discharge against the work at various angles. Moreover, two or more work supporting and turning assemblies may be mounted on each carrier and be designed to be simultaneously turned and blasted without departing from the spirit of the invention.

In most instances the blasting period provided by the dwell of the carrier in the blasting zone is sufficient to thoroughly clean the work in one passage through the machine. However, in the event that it is desired to render the machine more flexible, it may be provided with suitable mechanism for causing the carrier advancing mechanism to skip one or more cycles, so as to allow the carriers to each dwell for a longer period of time in the blasting zone.

Figures 14, 15, 16:
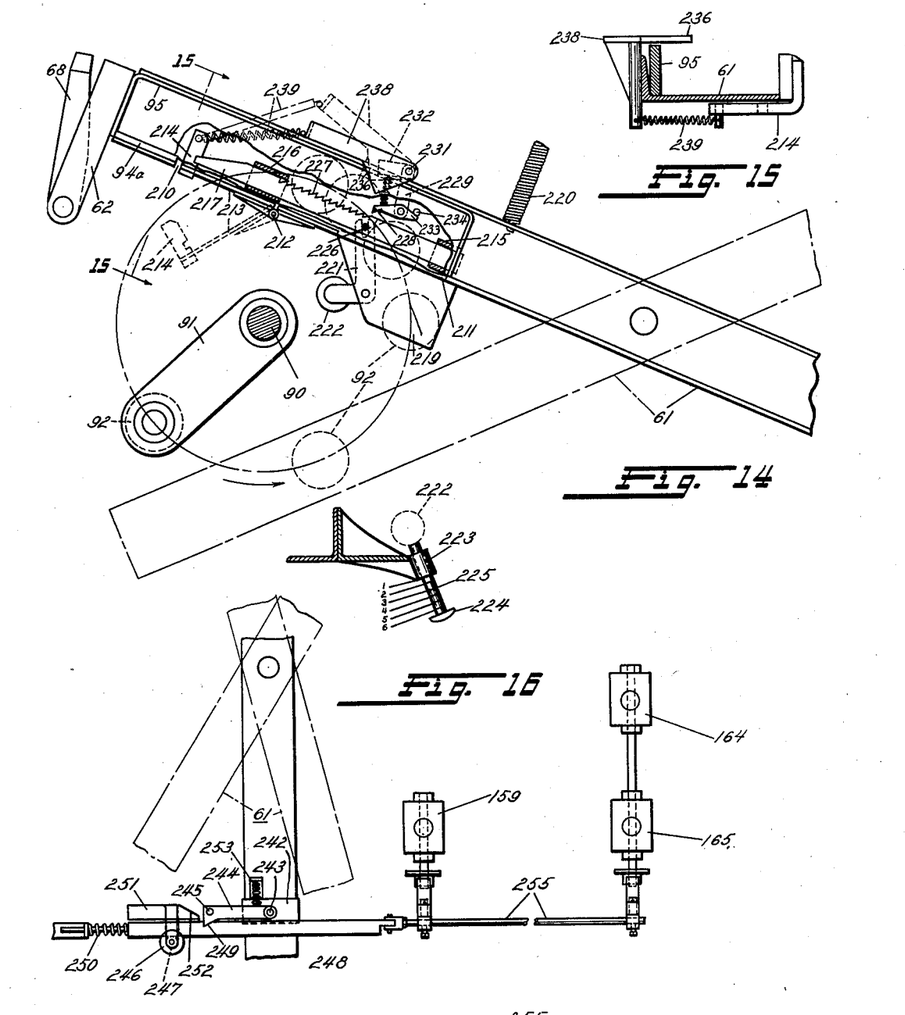
Figure 14 is a top plan view with parts in section, of a modified form of walking beam assembly forming part of my invention.
Figure 15 is a sectional view taken on the line 15—15 of Figure 14.
Figure 16 is a top plan view of an automatic abrasive cut-off assembly adapted for use with the machine shown in Figures 1 to 15 and forming part of my invention.

In Figures 14 and 15 I have shown one form of mechanism for accomplishing this result. With continued reference to these figures, walking beam 61 is provided with a raceway 95 similar to that shown in Figure 6, but raceway 94a is cut away in two places to provide openings 210 and 211 through which roller 92 may pass. Pivoted on a hinge 212 secured to the side of beam 61 is a closure 213 which is urged toward the closed position shown in Figure 14 by spring means. Closure 213 carries a latch part 214 which extends under beam 61 as seen in Figure 15. Slidably mounted on the underside of beam 61, by means of guides 215 and 216, is a latch bar 217, which when engaged with part 214 as shown in Figure 14, locks closure 213 in closed position. Bar 217 is preferably provided with means for yieldingly holding it in any set position, for instance a leaf spring associated with one of its guides (not shown).

It is apparent that when latch bar 217 is retracted, crank arm 91 may freely rotate in the direction indicated without producing movement of the carrier, because under these conditions roller 92 forces closure 213 into the dotted line position shown in Figure 14 and thereby "escapes" from beam 61. The roller then may freely enter opening 211 in the beam and mechanism is provided for selectively setting the mechanism to skip from one to six "cycles" of the shaft 91 without producing a corresponding actuation of walking beam 61.

Mounted on a bracket 219 secured to beam 61 is a bell crank lever 221 carrying a roller 222. Roller 222 cooperates with a timing stop assembly comprising a bracket 223, secured to any suitable stationary part of the machine and a slidable plunger 224 carrying suitable indicia 225 for indicating the cycle or period of blasting.

The other end of bell crank 221 is slotted and cooperates with a pin 226 carried by bar 217. Bar 217 is provided with a plurality of ratchet teeth 227 and cooperating therewith is a pawl 228 which is pivotally mounted on an arm 229 which in turn is pivotally conected by means of a shaft 231 to the walking beam. Pawl 228 is urged toward ratchet teeth 227 by means of a spring 232 and its rear end is provided with a cam face 233 which is adapted to cooperate with a stationary pin 234 secured to the underside of the walking beam.

Pawl 228 is automatically actuated by a cam plate 236 secured to pin 231 and which overlies beam 61 for cooperation with roller 92 as it passes back and forth in the channel in the walking beam. Cam plate 236 is provided with a lever portion 238 and secured to the free end thereof is a tension spring 239 which is connected to lock part 214 of closure 213.

With stop 224 disposed in the position shown in Figure 14, and assuming that roller 92 is confined in the channel of beam 61, the machine will operate in the same manner as that shown in Figures 1 to 13, inclusive, namely, beam 61 will reciprocate through a cycle each revolution of shaft 90 and the carriers will accordingly be advanced one step each revolution. The machine is accordingly set for one period blasting as the walking beam is synchronously carried back and forth by the crank arm.

If it is desired to blast the article for a longer period of time, say for four revolutions of shaft 90, stop 224 is pushed in to the mark opposite indicia 4. (A suitable frictionable detent of any known type, for instance a spring pressed ball, not shown, is employed to hold stop 224 in its set position). When shaft 90 now rotates in the direction indicated and rocks beam 61 anti-clockwise into the position shown in dotted lines in Figure 14, plunger 224 will strike roller 222 and retract ratchet bar 217 a distance of five notches. Pawl 228 does not interfere with this operation because stationary pin 234 maintains it out of engagement with the ratchet teeth of bar 217. As roller 92 now brings beam 61 from the dotted position into the full line position it will strike plate 236 and rock arm 229 clockwise and thereby actuate pawl 228. During the initial movement of pawl 228 it snaps free of pin 234 and spring 232 brings it into engagement with the ratchet teeth. This operation moves bar 213 one step toward locking position, but as it is still spaced a considerable distance from part 214 it does not lock closure 213.

Accordingly roller 92 passes freely out of opening 210 with the result that beam 61 remains stationary during the next rotation of roller 19. Because of roller 92 striking plate 236 and retracting bar 217 a distance corresponding to one ratchet tooth before the roller makes its first passage through gate opening 210, it is necessary to retract the bar one tooth greater than the number of cycles desired. Therefore, the distance setting plunger 224 must be moved twice as far between positions 1 and 2 than between 2 and 3 or any of the other positions. When roller 92 again enters opening 211 in walking beam, it again strikes plate 236 and then actuates pawl 228 and advances bar 217 one more step toward latching position. The mechanism continues to "idle" until the fourth rotation of shaft 90, and at this time pawl 228 actuates bar 217 into its final latching position and roller 92 again picks up beam 61 by engaging closure 213 which is now locked in closed position.

Beam 61 is preferably yieldingly maintained in its "idle" position shown in Figure 14 by means of a tension spring 220 connected thereto and anchored to any suitable part of the structure.

It is accordingly seen that I have provided a mechanism which makes it possible to handle any kind of work regardless of the time required to clean it, because by properly adjusting stop 224 the advancing mechanism may be caused to omit from one to six advancing steps, and thereby cause the carriers to be successively moved into blasting position and to dwell in such position for periods up to six complete "cycles" or revolutions of shaft 90.

With the carriers comparatively closely spaced about the conveyor track as shown, and with the work advancing mechanism employed, which comparatively rapidly brings a new article of work into the blast zone, only a small amount of abrasive is wasted while the work carriers are advancing. However, if it is desired, the machine may be equipped with means for automatically shutting off the abrasive supplied to the wheels while the work is being advanced, and in Figures 16 and 17 I have illustrated one mechanism that may be employed for this purpose.

Figure 17:
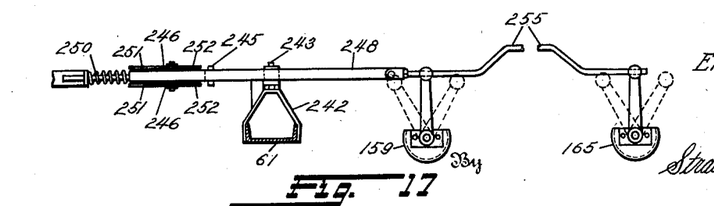
Figure 17 is a side elevational view of the mechanism shown in Figure 16.

With continued reference to these figures, walking beam 61 is provided with a bracket 242 upon which is mounted a pin 243. Pivoted upon pin 243 is a pawl 244 having a pin 245 which extends beyond both faces thereof. Mounted for reciprocation adjacent pawl 244, by means of a pair of stationary guides 246 and a roller 247, is a bar 248 having a ratchet tooth recess 249 which cooperates with pawl 244. Bar 248 is normally urged to the right by means of a compression spring 250 cooperating with a plunger or guide. Stationarily supported with guides 246 and roller 247 is a pair of members 251 having pawl disengaging faces 252 adapted to cooperate with pin 245.

Pawl 244 is normally urged toward bar 248 by means of a compression spring 253 carried by bracket 242. Pivoted to bar 248 is a rod 255 which is pivotally connected to the crank arms of abrasive valves 159, 165 and 164, the last two being controlled by the same shaft.

With the parts disposed in the full line positions shown in Figures 16 and 17, and assuming that the walking beam is rocking clockwise, and hence is advancing a fresh article of work to the blasting zone, pawl 244, by reason of its engagement with rod 248, is moving the valves toward closed position. Slightly before the work is brought into the blasting zone, pin 245 engages and rides up on inclined faces 252, which lift pawl 244 out of recess 249. As soon as the parts are free, spring 250 quickly snaps the abrasive valves into open position and the blast wheels are accordingly promptly supplied with abrasive. While the walking beam is going through its return stroke, pawl 244 merely rides upon bar 248. When bar 248 reaches the end of its stroke pawl 244 drops into recess 249, and when the beam 61 begins its work advancing stroke, bar 248 closes the abrasive valves in the manner just described. By automatically cutting off the abrasive flow in this manner, the wear on the blades of the wheels, the wear of the cabinet walls, and the disintegration of the abrasive, are materially reduced. It is to be understood that any desired timing of the abrasive may be effected by the apparatus just described by adjusting the points at which the pawl is picked up and tripped.

Figures 18, 19, 20, 21, 23, 24:
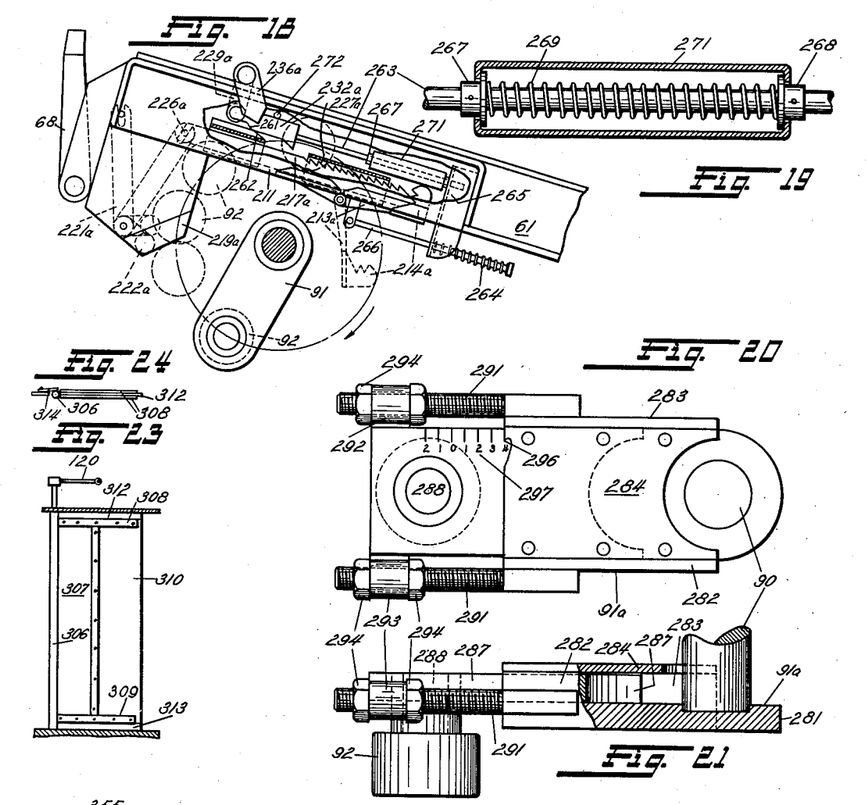
Figure 18 is a view similar to Figure 14, but illustrates a modified form of timing mechanism also forming part of my invention.
Figure 19 is a sectional view of the spring plunger assembly shown in Figure 18.
Figure 20 is a top plan view of a modified form of crank assembly that may be used in the machine shown in Figures 1 to 19, also forming part of the invention.
Figure 21 is a side elevation of the crank assembly of Figure 20.
Figure 23 is a front view of one of the doors preferably employed in my machine.
Figure 24 is a top plan view of the door shown in Figure 23.

In Figures 18 and 19 there is illustrated a timing mechanism which is somewhat similar to that shown in Figures 14 and 15 and as many of the parts are similar, corresponding reference characters, with the subscript "a" will be used to designate them in these figures.

In this form of the invention crank 91 and roller 92 rotate in the opposite direction from the previously described forms of the invention and walking beam 61 is accordingly reciprocated at a greater speed in a counterclockwise direction than in a clockwise direction. The positions of ratchet bar 217a, bell crank 221a and door or gate 214a are reversed in this form of the invention to take care of the reversed rotation and pawl 232a is of slightly different form as it is provided with a cam face 261 which cooperates with a cam 262 mounted on the lower face of the walking beam.

As seen in Figure 18, cam 262 normally holds pawl 232a free of ratchet teeth 227a, and when roller 92 strikes plates 236a and rocks lever 229a, pawl 232a is moved to the right and rides off of cam 262 and drops into teeth 227a of ratchet bar 217a.

Closure 213a is urged toward closed position by a spring 264 reacting against a bracket 265 carried by the walking beam and acting against a rod 266 connected to the closure. Pawl 232a is connected to a rod 263 having a pair of collars 267 and 268 secured thereto. A spring 269 encircles rod 263, and bears against collars 267 and 268 and against the ends of a hollow sleeve 271, the latter being secured to beam 61. Spring 269 normally holds pawl 232a in the position shown in Figure 18, and when lever 229a pushes pawl 232a to the right collar 267 compresses spring 269 between it and the other end of sleeve. Pawl 232a and rod 263 act in effect as a toggle, and a stationary guide pin 272 prevents the toggle from "breaking" upwardly when roller 92 moves pawl 232a to the left and compresses spring 269 between collar 268 and the other end of sleeve 271.

This device operates in a manner similar to that previously described. With gate 213a locked and with roller 92 disposed within the channel of beam 61 and rotating through its orbit in the direction shown, the walking beam will reciprocate and advance the carriers one step each time shaft 90 makes a complete revolution. During this operation roller 92 will strike plate 236a and reciprocate pawl 232a idly back and forth only once each cycle because when roller 92 moves to the right plate 236a and pawl 232a are only able to follow the roller as far as the position shown in Figure 18, by reason of the double acting spring assembly.

Assuming that plunger 224 (not shown in Figure 18) is set for four period blasting, roller 222a will strike plunger 224 and retract ratchet bar 217a a distance corresponding to five notches. When roller attains its upper position, it will actuate pawl 232a and advance bar 217a one notch as before. Roller 92 will then push gate 213a open and pass through its orbit leaving beam 61 idle. Roller 92 will successively strike plate 236a each revolution and advance ratchet bar 217a toward locking position, and at the end of four revolutions of roller 92 the latter will pick up beam 61 and advance the carriers.

In Figures 20 and 21 is illustrated one form of mechanism for adjusting the point at which each carrier will dwell in the blasting zone. In this form of the invention the dwell point is adjusted by adjusting the length of crank 91a and hence the amplitude of reciprocation of walking beam 61.

Crank 91a comprises a part 281 rigidly secured to shaft 90 and providing a pair of side walls 282 and 283 and a top wall 284. Mounted for reciprocating adjusting movements with the guide provided by crank 91a is a crank pin member 287 in which is mounted a pin 288. Roller 92 is journalled on pin 288.

The parts are held in adjusted position by means of a pair of studs 291, each of which is secured to one of side plates 282 and 283. Studs 291 pass freely through openings in a pair of ears 292 and 293 formed on member 287 and they are locked with respect thereto by means of a pair of lock nuts 294.

As shown in Figures 20 and 21, the parts are fully extended and crank 91a is accordingly of maximum length, and therefore each carrier will be advanced a maximum distance. In the particular machine shown the maximum travel of the carrier places the dwell point of the axis of rotation of the work four inches beyond the intersection of the blast streams. The device can, of course, be calibrated in angles or any other unit of measurement. The indicator finger 296 of plate 284 is accordingly in register with numeral "4" of the indicia 297 marked on arm 287.

If it is desired to stop the work before it attains the intersection of the blast streams, nuts 294 are adjusted on studs 291 to draw arm 287 inwardly until finger 296 registers with one of the numerals the other side of zero. The machine is designed so that the carriers will dwell at the intersection of the blast streams when finger 296 registers with the "zero" numeral. As previously pointed out, the parts are so designed that walking beam 61 has an amplitude of swing which is greater than the angle between adjacent carriers, hence pawls 68 will always pick up the carriers, irrespective of whether crank 91a be adjusted to give a long or a short throw. When the crank is adjusted to give a short throw there will of course be more "lost motion" present when the pawls pick up the carriers.

When the machine is equipped with a crank of the character just described I preferably employ a backstop pawl assembly of the type shown in Figure 22. In this assembly a pawl 301, having teeth 302, is mounted on a pivot 303 adjacent the path of travel of the carriers. A spring 304 normally maintains pawl 301 in engagement with the outer periphery of ring 16.

This pawl assembly functions to prevent rearward movement of the carriers irrespective of where they are stopped because any reverse rotation tendencies of ring 16 causes teeth 302 to bite thereinto and lock the carriers. If desired the outer periphery of ring 16 may be provided with serrations to augment the locking action.

In Figures 23 and 24 is illustrated one of the doors preferably employed in my machine. Each door comprises a pipe or shaft 306 to the upper end of which is secured the operating lever 120. Welded to shaft 306 is a plate 307, and bolted to the top and bottom edges of this plate are a pair of bars 308 and 309. Secured to the free edge of plate 307 and bars 308 and 309, by means of clamping bars and bolts, is a comparatively thick curtain 310 of rubber or any other suitable flexible material. Also clamped to bars 308 and 309 are a pair of flaps 312 and 313, which are adapted to wipe against the top and bottom surfaces of the cabinet and establish a dust tight seal. In order to seal the doors adjacent the hinges each door is provided with a flap of flexible material 314, which wipes against shaft 306.

By reason of flexible material 310 each pair of doors seal tightly and as they are held in suspended position by bars 308 and 309 they will not sag out of shape even after they have been in use for some time. The work, in passing through the machine, strikes part 310, thereby swinging the doors open against the action of springs 119, and parts 310, being soft, do not injure even the most fragile castings.

In Figure 25 I have diagrammatically illustrated a simple linkage mechanism for simultaneously operating the control cages 133 of wheels U and L. As previously pointed out, if a piece of work having a vertical dimension greater than that shown in Figure 1 is placed in the machine, it is preferably supported so that its transverse axis will lie substantially intermediate the top and bottom walls of the blast chamber. It is accordingly necessary to lower the blast stream from wheel L, and to raise, by an equal amount, the blast stream from wheel U.

The mechanism shown in Figure 25 effects a simultaneous adjustment of both wheels and comprises a lever 320 pivoted at 321 in any suitable manner on the cabinet and is connected to control members 133 of wheels U and L by means of a pair of links 322 and 323 respectively. By rocking lever 320 clockwise the control member of wheel U is rocked counter-clockwise and the blast stream lowered and the control member of wheel L is rocked in a clockwise direction and its stream raised. In Figure 25 a shorter piece of work is shown and the wheels adjusted to properly abrade it. Longer articles of work may be accommodated by rocking lever 320 counter-clockwise.

A plate 325, having any suitable form of graduations, for instance, it may be marked in terms of vertical work height, may be mounted adjacent a pointer portion 326 of lever 320. If under some conditions it is desirable, links may be connected to the control member of wheel U 180 degrees from the position shown, whereby both control members 133 will rock clockwise in response to clockwise movement of lever 320. Moreover, lever 320 may be reciprocated by any suitable power operated timed mechanism for causing the blast streams to sweep up and down as the work is suspended in the blast zone without departing from the spirit of the invention. For instance, the mechanism could be synchronized with the work-turning mechanism, so as to cause the blast streams to sweep over the work in a predetermined manner each revolution.

Figure 26:
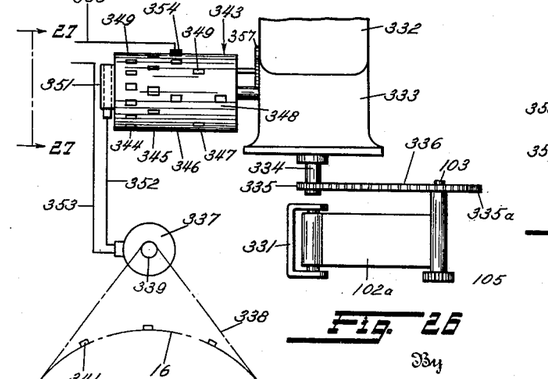
Figure 26 is a diagrammatic view of a modified form of mechanism for advancing the carriers, also forming part of my invention.

As previously pointed out, the walking beam disclosed is only one form the work-advancing mechanism may assume. In Figure 26 I have illustrated a different form of work-advancing mechanism and also an independent motor for rotating the work, whereby it may be turned independently of the work-advancing mechanism.

In this figure the work-turning motor drive is shown in elevation and the sprocket and chain drive for the carriers is shown (on a reduced scale) diagrammatically in top plan view. Arm 102a is shorter vertically than arm 102 and is mounted on a support 331 for swinging movement about a vertical axis so as to bring gear 105 into mesh with the various carrier gears 28. Mounted above support 331 is a motor 332 having any suitable speed reducing mechanism 333. The output shaft 334 is disposed directly over the pivot for arm 102a. A sprocket 335 is mounted on shaft 334 and drives a similar sprocket 335a on shaft 103 by means of a chain 336.

The carrier assembly is driven by a motor 337 coupled thereto by means of a chain 338, passing over a sprocket 339 driven by the motor, and passing around ring 16. Chain 338 may mesh with teeth formed on ring 16 or with teeth elements 341 secured thereto at properly spaced intervals.

By independently driving gears 28 and the carrier assembly, it is apparent that the work may be made to dwell for any desired period in the blast zone and may be rotated at any speed therein by suitably controlling the circuits for motors 332 and 337. One form of control mechanism is shown in Figure 26 and comprises a commutator drum 343 driven at comparatively low speed from gear box 333.

Drum 343 is provided with a plurality of rows 344, 345, 346, 347 and 348 of segments 349. All of the segments are of equal circumferential length, in order that the carriers will be advanced an equal amount every time the circuit is made, and they are connected to a slip ring 351. A lead 352 and a brush connect slip ring 351 to motor 337. Another lead 353 connects the motor with one side of the line. The other side of the line is connected to a sliding contact finger 354 by means of a lead 355. Finger 354 is guided for movement axially of the drum on a non-circular rod 356, which is carried by a plate 357. Plate 357 is provided with a pair of curved slots 358 through which a pair of screws 359 extend and clamp plate 357 to the housing of gear assembly 333.

Assuming that motor 332 is operating, the carriers are loaded and finger 354 is disposed in the position shown, the carriers will be successively advanced each time that a segment 349 contacts finger 354 and closes the circuit for motor 337. Segments 349 are so designed that with a predetermined constant speed of drum 343, the circuit for motor 337 is closed for a time interval sufficiently long to advance the carrier assembly a distance equal to the distance between two adjacent carriers. In order to positively stop each carrier as it is brought into blasting position the shaft of motor 337 is preferably provided with an automatic brake for stopping the motor as soon as the circuit is broken. For instance, an electromagnetically operated brake of the type commonly used in elevator drives may be used if desired.

When each carrier is successively brought into the blast zone its gear meshes with pinion 105 and is accordingly driven by motor 332. If it is desired to vary the work-turning speed by varying the speed of motor 332, drum 343 is preferably driven by an independent motor so as to maintain its speed substantially constant, and the appended claims are intended to cover the timing mechanism irrespective of the source of power for drum 343.

If it is desired to increase or decrease the time period during which each carrier will dwell in the blast zone, finger 354 is slid axially to cooperate with another row of segments. To increase the period finger 354 is slid to the right of the position shown in Figure 26 to cooperate with segment rows 347 and 348, whose segments are spaced further apart than those of row 346. Finger 354 is slid to the left to cooperate with segment rows 344 and 345 to shorten the period.

Figure 27:
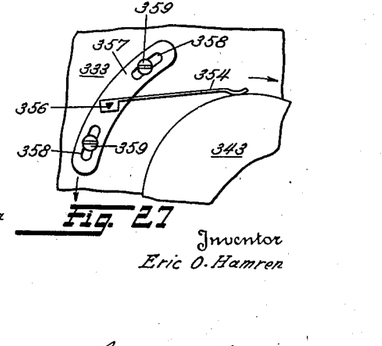
Figure 27 is a view taken on line 27—27 of Figure 26.

As illustrated, the parts are adjusted to stop the carriers and rotate the work about an axis adjacent the intersection of the blast streams. If it is desired to stop the carriers beyond this dwell point, screws 359 are loosened and plate 357 rocked a slight predetermined amount in a clockwise direction and the screws again tightened. The effect of this is to cause the carrier assembly to be picked up later and stopped later in point of time, and thereby stop and dwell at a point beyond that for which it is set in Figure 27. If it is desired to stop the carriers prior to attaining the intersection of the blast streams plate 354 is adjusted in the opposite direction, i. e., counterclockwise so as to cause motor to pick up and stop the carrier earlier.

Certain features of the apparatus shown herein are disclosed and more broadly claimed in the copending application of William A. Rosenberger, Serial No. 34,990, filed August 6, 1935.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an abrading machine, a circular track disposed in a substantially horizontal plane, a plurality of carriers mounted for guided movement on said track, at least one work support mounted for rotation about a substantially vertical axis on each of said carriers, and means for rigidly interconnecting all of said carriers for synchronous movement about said track.

2. The abrading apparatus described in claim 1, wherein said means comprises at least one ring member connected to each of said carriers.

3. In an abrading machine, a cabinet of generally U-shaped form in the top plan view and having an arcuately shaped slot in its upper surface, a circular track supported above said cabinet and lying substantially in a horizontal plane, a plurality of work supports mounted for guided movement on said track and depending through the slot in said cabinet, the central portion of said cabinet defining a blasting zone and being provided adjacent its bight with devices for projecting abrasives at abrading velocities toward both sides of articles moving through said blasting zone in the path defined by said circular track, said devices being located on opposite sides of the path of movement of said articles.

4. The abrading apparatus described in claim 3, wherein said devices comprise at least one abrasive throwing wheel assembly mounted on the exterior surface of opposite walls of said cabinet and registering with openings in the latter for projecting abrasive into said blasting zone.

5. In an abrading apparatus, a cabinet structure having a slot in its upper surface, a track mounted above said cabinet, a plurality of carriers mounted for guided movement on said track and having elements depending through the slot in said cabinet, at least one baffle member located in said cabinet adjacent said slot and carried by said elements for synchronous movement therewith, said baffle member having a width greater than the width of said slot, for preventing rebounding abrasive from escaping from said cabinet.

6. In an abrading machine, a conveyor mechanism for carrying articles of work in a substantially horizontal path through a blasting zone, a plurality of rotatable abrasive propelling devices mounted adjacent the path of movement of said articles of work for cleaning the same, each of said abrasive propelling devices being operable to substantially tangentially throw a restricted fan-shaped stream of abrasive toward said articles of work, one of said abrasive propelling devices being located with its axis of rotation adjacent the upper part of the path of movement of said articles of work and being an overshot abrasive propelling wheel, for cleaning the top surfaces and the upper part of the sides thereof, and another of said abrasive propelling devices being located with its axis of rotation disposed adjacent the lower part of the path of movement of said articles of work and being an undershot abrasive propelling wheel, for cleaning the bottom surfaces and the lower part of the sides thereof, said abrasive propelling devices being provided with means for simultaneously adjusting their discharge streams about their axes, for accommodating the machine to articles of work of various heights.

7. In an abrading machine, a track, a plurality of carriers mounted for guided movement on said track and operable to carry articles of work from a loading zone to a blasting zone, means connecting said carriers together for synchronous movement, at least one work support journaled upon each of said carriers for rotation about a substantially vertical axis, each of said work supports having a toothed driving member, and yieldingly supported driving means for engaging said toothed driving member, and rotating said work support when said carrier is brought into said blasting zone.

8. The abrading machine described in claim 7, wherein said yieldingly supported driving means comprises a gear mounted for rotation and also for limited translational movement toward and away from said toothed driving means of said work support.

9. The abrading machine described in claim 7, together with means for intermittently advancing said carriers into said blasting zone, said yieldingly supported driving means being automatically operable to successively engage and drive the toothed members of said work supports as they are brought into said blasting zone.

10. In an abrading machine, a track, a plurality of carriers mounted for guided movement on said track and operable to carry articles of work from a loading zone into a blasting zone, means connecting said carriers together for synchronous movement, at least one work support journaled upon each of said carriers and having a driving member, means for intermittently advancing said carriers into said blasting zone, power operated means for automatically engaging and driving the driving member of each work support when it is brought into said blasting zone, and means for inhibiting retrograde movement of said carriers when said driving members engage said power operated means.

11. In an abrading machine, a plurality of carriers mounted for movement from a loading zone into a blasting zone, a mechanism for causing said carriers to intermittently advance into said blasting zone, to dwell in said blasting zone for a period of time that is greater than the time required to advance said carriers into said blasting zone, and to then pass out of said blasting zone, comprising a reciprocable member having means for establishing a connection between it and said carriers in succession, and means for causing said member to reciprocate at a greater speed in one direction than in the reverse direction.

12. In an abrading machine, a conveyor for carrying articles from a loading zone to a blasting zone, a reciprocating mechanism for causing said conveyor to advance said articles one step each cycle, and selectively operable means for causing said mechanism to only advance said conveyor one step each second or more cycles.

13. In an abrading machine, a plurality of work carriers mounted for movement into a blasting zone, means for advancing said carriers step-by-step into said blasting zone and for causing each of said carriers to successively dwell therein for a predetermined treatment of the article of work supported thereby, an abrasive propelling mechanism mounted in said blast zone, means for feeding an abrasive to said abrasive propelling mechanism, and means for causing said last-named means to automatically cease feeding abrasive when said carriers are being advanced by said first-named means.

14. In an abrading apparatus, a cabinet structure having a slot in its upper surface, a track mounted above said cabinet, a plurality of carriers mounted for guided movement on said track and having elements depending through the slot in said cabinet, at least one baffle member located in said cabinet adjacent said slot and carried by said elements for synchronous movement therewith, said baffle member having a width greater than the width of said slot, for preventing rebounding abrasive from escaping from said cabinet, and a second baffle member having a plurality of apertures around its circumference corresponding to the spacing between said elements, said second baffle member having the apertures thereof threaded over said elements for synchronous rotation therewith, said second baffle member frictionally resting upon said cabinet structure and bridging said slots and cooperating in sealing engagement therewith, said elements extending loosely through said second baffle member whereby the latter may freely gravitate downwardly thereon and rest upon said cabinet.

15. In an brading apparatus, a conveyor mechanism for moving articles of work through a blasting zone, means for driving said conveyor mechanism, comprising an elongated member mounted for oscillation and connected to and operable to advance said conveyor one step each time it oscillates, a crank mounted for rotation adjacent said member, and variable functioning means for connecting said crank to said member, said variable functioning means being selectively operable to either oscillate said member upon each revolution of said crank or upon each predetermined number of revolutions of said crank.

16. In an abrading apparatus, a conveyor mechanism for moving articles of work through a blasting zone, means for driving said conveyor mechanism comprising an elongated member mounted for oscillation and connected to and operable to advance said conveyor one step each time it is oscillated, said member having guideway means provided thereon, a crank mounted for rotation adjacent said member and having the free end thereof engaged with said guideway means, said guideway means being selectively operable to allow said crank to disengage itself from said member to allow said crank to undergo an idle stroke independently of said member, and control means for said guideway means operable to cause said member to either oscillate upon each revolution of the crank or upon each predetermined number of revolutions of said crank.

17. The abrading apparatus described in claim 16, wherein said guideway means comprises a pair of flange elements provided upon said member, one of said flange elements being pivoted so as to open the guideway formed by said flange elements and allow said crank to become disengaged therefrom.

18. In an abrading apparatus, a conveyor mechanism for moving articles of work through a blasting zone, means for driving said conveyor mechanism comprising an elongated member mounted for oscillation and connected to and operable to advance said conveyor one step each time it is oscillated, said member having a guideway provided thereon, a crank mounted for rotation adjacent said member and engaged with said guideway means of said member, said crank having means for varying the effective length thereof, whereby the distance that said articles of work are advanced by said crank may be selectively varied.

19. In an abrading apparatus, a conveyor mechanism for moving articles of work through a blasting zone, means for driving said conveyor mechanism including an electric motor connected to said conveyor mechanism, and means for controlling the supply of electric power to said motor comprising a circuit, a circuit controlling means comprising means for closing said circuit for a length of time sufficient to allow said motor to advance said conveyor mechanism a distance corresponding to the spacing of said articles of work and then automatically break said circuit, said circuit control means being operable to maintain said circuit broken for a longer period than it is maintained closed, to thereby maintain said articles of work at rest in said zone for a longer period of time than is required to bring said articles of work into said blast zone.

20. The abrading apparatus described in claim 19, wherein said circuit controlling means embodies adjustable means for selectively varying the time interval during which said circuit is broken, to thereby vary the length of time said articles of work will be treated in said blast zone.

21. The abrading apparatus described in claim 19, wherein said circuit controlling means embodies means for selectively varying the position where said motor will stop said articles of work in said blast zone, for varying the abrading action to which the work is subjected in said blast zone.

22. In an abrading machine, a plurality of work carriers having means mounting them for translational movement in a substantially horizontal path from a loading zone to a blasting zone, and means for causing said carriers to intermittently advance into said blasting zone, to dwell in said blasting zone for a period of time that is greater than the time required to advance said carriers into said blasting zone, and to then pass out of said blasting zone, said second named means comprising a reciprocable member having means for establishing a yielding connection between it and said carriers in succession.

23. In an abrading apparatus for subjecting work units to the action of abrasive thrown at high velocity, said work units comprising at least one member having at least one opening therein, means providing a loading zone and a blasting zone, conveyor means for transporting said work units in succession from said loading zone to said blasting zone, blast means in said blasting zone for projecting at least one fan-shaped stream of abrasive toward said work units as they travel through said blasting zone, said conveyor means being operable to advance said work units into said blasting zone and to cause each work unit to dwell for a predetermined time in front of said blast means, said conveyor means also embodying means for causing each of said work units to rotate about an axis disposed substantially transverse to the path of movement of said work units through said blasting zone to present alternately their openings to the action of said stream of abrasive as said work units successively dwell in front of said blast means, said axis being offset a predetermined distance from said blast stream, to thereby insure thorough cleaning of the interior surfaces of the openings in said work units, the plane of said blast stream being substantially parallel to the axis of rotation of said work units.

24. The abrading apparatus set forth in claim 23, wherein said conveyor means embodies means for selectively adjusting the point of dwell of said work units in said blasting zone, whereby the degree of offset of said axis of rotation of said work units from said blast stream may be selectively varied, for varying the action of said blast stream upon said work units.

25. In an abrading apparatus for subjecting work units to the action of abrasive thrown at high velocity, said work units comprising at least one member having at least one opening therein, means providing a loading zone and a blasting zone, conveyor means for transporting said work units in succession from said loading zone to said blasting zone, blast means in said blasting zone for projecting at least one stream of abrasive in a direction substantially transversely to the path of movement of said work units through said blasting zone, said conveyor means being operable to advance said work units into said blasting zone and to cause each work unit to dwell for a predetermined time in front of said blast means, said conveyor means also embodying means for causing each of said articles to rotate about an axis disposed substantially transverse to the path of movement of said work units through said blasting zone and alternately present their openings to the action of said stream of abrasive as said work units successively dwell in front of said blast means, said axis being offset a predetermined distance along said path from said blast stream, to thereby insure thorough cleaning of the interior of the opening in said work units, and a second blast means in said blast zone for projecting a stream of abrasive generally transverse to the path of movement of said work units and so located as to intersect said path of movement of said work units at a point offset from said axis about which said work units rotate in front of said first-named blast means.

26. The abrading apparatus set forth in claim 25, wherein said blast means are located on either side of the path of movement of said work units and are so disposed as to project their blast streams at an angle of somewhat less than 180° to each other, said blast streams having a common point of intersection adjacent the path of movement of said work units.

27. In the art of cleaning articles by subjecting them to the action of a blast stream, the method of conveying an article to a blasting position located between, and offset from the intersection of the centers of at least two substantially oppositely disposed fan-shaped blast streams, stopping said article at said blasting position and rotating it for a predetermined length of time about an axis disposed substantially transverse to the path of movement taken by the article being conveyed into said blasting position, and substantially parallel to the planes of said blast streams.

28. In an abrading apparatus, a cabinet providing a blasting zone, a conveying mechanism for moving articles of work in a substantially horizontal path through said blasting zone, comprising a series of inter-connected carriers, means for directing an abrasive blast against the articles of work located in said blasting zone, and means for intermittently advancing said carriers a distance at least as great as the spacing of said carriers and bring at least one of said articles of work into blasting position in said blasting zone, comprising an enlongated member mounted for oscillation adjacent said conveying mechanism and having ratchet means at the free end thereof, for cooperation with parts of said conveying mechanism to advance the latter when said member is rocked in one direction, said member being incapable of effecting movement of said conveyor mechanism when it is rocked in the opposite direction, said ratchet means comprising a pivotal pawl mounted on said member and resiliently urged toward cooperation with said conveyor mechanism parts, said pawl embodying resilient means for allowing a predetermined yield thereof in response to impact of said pawl with said conveyor mechanism parts.

29. In an abrading apparatus, a cabinet providing a blasting zone, a conveying mechanism for moving articles of work in a substantially horizontal path through said blasting zone, comprising a series of interconnected carriers, means for directing an abrasive blast against the articles of work located in said blasting zone, and means for intermittently advancing said carriers a distance at least as great as the spacing of said carriers and bring at least one of said articles of work into blasting position in said blasting zone, comprising an enlongated member mounted for oscillation adjacent said conveying mechanism and having ratchet means at the free end thereof for cooperation with parts of said conveying mechanism to advance the latter when said member is rocked in one direction, said member being incapable of effecting movement of said conveyor mechanism when it is rocked in the opposite direction, said member having a guideway, a crank mounted for rotation and having roller means cooperating with said guideway for effecting oscillation of said member, the axis of rotation of said crank being so located with respect to said member as to cause the latter to oscillate faster in one direction than in the opposite direction when said crank is rotated, said member causing said conveying mechanism to advance when said member oscillates in said one direction.

30. In an abrading apparatus, a cabinet providing a blasting zone, a conveying mechanism for moving articles of work in a substantially horizontal path through said blasting zone comprising a series of interconnected carriers, means for directing an abrasive blast against the articles of work located in said blasting zone, and means for intermittently advancing said carriers a distance at least as great as the spacing of said carriers and bring at least one of said articles of work into blasting position in said blasting zone, comprising an elongated member mounted for oscillation adjacent said conveying mechanism about an axis intermediate its ends and having ratchet means at both free ends thereof for cooperation with substantially diametrically opposite parts of said conveying mechanism to advance the latter when said member is rocked in one direction, said member being incapable of effecting movement of said conveyor mechanism when it is rocked in the opposite direction.

31. In an abrading apparatus for subjecting work units to the action of abrasive thrown at high velocity, said work units comprising at least one member having at least one opening therein, means providing a loading zone and a blasting zone; conveyor means for transporting said work units in succession from said loading zone to said blasting zone; blast means in said blasting zone for projecting abrasive towards said work units as they travel through said blasting zone; said blast means comprising a rotatable abrasive propelling device located with its axis of rotation adjacent the upper part of the path of movement of said articles of work and being an overshot abrasive propelling wheel, for cleaning the top surfaces and the upper part of the sides thereof, and a second abrasive propelling device located with its axis of rotation disposed adjacent the lower part of the path of movement of said articles of work and being an undershot abrasive propelling wheel, for cleaning the bottom surfaces and the lower part of the sides thereof; said conveyor means being operable to advance said work units into said blasting zone and to cause each work unit to dwell for a predetermined time in front of said blast means; said conveyor means also embodying means for causing said work units to rotate about an axis disposed substantially transverse to the path of movement of said work units through said blasting zone to present alternately their opening to the action of said streams of abrasive as said work units successively dwell in front of said blast means, said axis of rotation of said work units being offset a predetermined distance from said last streams, to thereby insure thorough cleaning of the interior surfaces of the openings of said work units, the planes of said blast streams being substantially parallel to the axis of rotation of work units.

ERIC O. HAMREN.